(12) United States Patent
Toomey et al.

(10) Patent No.: US 7,974,986 B1
(45) Date of Patent: Jul. 5, 2011

(54) SYSTEM, METHOD AND COMPUTER PROGRAM PRODUCTS FOR RESUME BLASTING

(75) Inventors: Paul Toomey, Palm Harbor, FL (US); William Bryan Megargel, Tarpon Springs, FL (US)

(73) Assignee: Geographic Solutions, Inc., Palm Harbor, FL (US)

( * ) Notice: Subject to any disclaimer, the term of this patent is extended or adjusted under 35 U.S.C. 154(b) by 109 days.

(21) Appl. No.: 11/479,316

(22) Filed: Jun. 30, 2006

(51) Int. Cl.
*G06F 7/00* (2006.01)
(52) U.S. Cl. ....................................................... 707/784
(58) Field of Classification Search .................. None
See application file for complete search history.

(56) References Cited

U.S. PATENT DOCUMENTS

2002/0091689 A1* 7/2002 Wiens et al. ...................... 707/6
2004/0172417 A1* 9/2004 Hartman et al. ............ 707/104.1

* cited by examiner

*Primary Examiner* — Pierre M Vital
*Assistant Examiner* — Truong V Vo
(74) *Attorney, Agent, or Firm* — Larson & Larson, P.A.; Frank Liebenow; Justin Miller

(57) ABSTRACT

Systems, methods and computer program products include capturing a job seeker's résumé, capturing a list of career websites on which the job seeker desires to post his or her résumé and for each career website specified, logging onto that career website and posting the job seeker's résumé to that career website. If the job seeker doesn't have an account on a specific career website, one is created for him/her.

25 Claims, 13 Drawing Sheets

170

Florida - Tampa —— 172

Job Title: Tax Preparer —— 173
Requisition Number: 00073-044444 —— 174

RESPONSIBILITIES:
Accountant/ Bookkeeper in N. Tampa. Full charge for bookkeeping and financial statements.

EDUCATIONAL REQUIREMENTS:
3yr. exp/ education, exc. computer skills req. Non-profit accounting exp CANDIDATE PROFILE:
Candidate must be able to manage the bookkeeping for a medium sized non-profit organization.

Company: H&R Block —— 175

Click here to submit resume. If you do not have a current resume, click here to submit a career profile.

Confidential Résumé of Ray Seeker —— 182

———————— Patent Attorney ———— 184
                                        —— 186
EXPERIENCE:

February 2002-Present: Patent Attorney for Wilson, Wilson and Love. Responsibilities include defensive intellectual property litigation in the electronics industry.

August 1998-January 2002: Patent Attorney for Jones, Torks and Dolenz. Responsibilities include preparing and prosecuting patent applications for automotive electronic assemblies.

EDUCATION: —— 188

JD, University of Nebraska, Lincoln, NE
BS in Electrical Engineering, Stevens Institute of Technology, Hoboken, NJ, GPA 3.8.

PERSONAL: —— 190

Home Phone: 800-555-1212
Cell Phone: 800-555-1213
Address: 1313 MockingBird Lane, Tampa, FL
Email: grandpa@hotmail.com

Developer

| | Resume Name: Developer  Modified: 5/22/06 — 300 |
|---|---|
| | Privacy Option: Available — 302 |
| | Visible Contact Info: Name, Email, Phone — 304 |

Personal Information: [Edit] — 306

Name: Ray Seeker      Email: grandpa@hotmail.com
    Phone: 800-555-1212
    Home Location: US-FL-Tampa-33604

Experience: [Edit] — 308

Total Years exp: 4      Most Recent Wage:
    Managed Others: No      Languages Spoken:
    Job Categories: Patent Law      Felony Conviction: No
    Security Clearance: No

Education: [Edit] — 310

School: Univ of Nebraska      Major: Law      Degree: JD
    School: Steven's Inst.      Major: CS      Degree: BS

Desired Position: [Edit] — 312

Desired wage: — 314
    Desired employment type:
    Desired Commute:
    Desired Travel:
    Willing to relocate: — 316
    <click the edit to add new locations>

FIG. 9

| VIRTUAL OneStop | | | |
|---|---|---|---|
| Résumé to be submitted: Spider Developer | | | |
| Career Site | Username Password | Username | Password |
| ☑ CareerBuilder<br>Resume last modified 5/22/2006 | ⦿ default<br>○ pre-existing | johndoe | •••••••• |
| ☑ AmericaJobBank<br>Resume last modified 5/22/2006 | ⦿ default<br>○ pre-existing | johndoe | •••••••• |
| ☑ HotJobs<br>Resume last modified 5/22/2006 | ⦿ default<br>○ pre-existing | johndoe | •••••••• |
| ☑ JobToaster<br>Resume last modified 5/22/2006 | ⦿ default<br>○ pre-existing | johndoe | •••••••• |
| ☑ Dice<br>Resume last modified 5/22/2006 | ⦿ default<br>○ pre-existing | johndoe | •••••••• |
| ☑ BestJobUSA<br>Resume last modified 5/22/2006 | ⦿ default<br>○ pre-existing | johndoe | •••••••• |

FIG. 12

| VIRTUAL OneStop | 360 |
|---|---|
| Résumé: Spider Developer | |

| Career Site | Status |
|---|---|
| ☑ CareerBuilder<br>Resume last modified 5/22/2006 | Resume created successfully 06/02/06 |
| ☑ AmericaJobBank<br>Resume last modified 5/22/2006 | Could not create copy resume |
| ☑ HotJobs<br>Resume last modified 5/22/2006 | Resume created successfully 06/02/06 |
| ☑ JobToaster<br>Resume last modified 5/22/2006 | Resume created successfully 06/02/06 |
| ☑ Dice<br>Resume last modified 5/22/2006 | Resume created successfully 06/06/06 |
| ☑ BestJobUSA<br>Resume last modified 5/22/2006 | Pending |

FIG. 13

SYSTEM, METHOD AND COMPUTER PROGRAM PRODUCTS FOR RESUME BLASTING

BACKGROUND OF THE INVENTION

1. Field of the Invention

This invention relates to the field of online job application and more particularly to a system, method and apparatus for submitting a résumé to job websites.

2. Description of the Related Art

Finding a job has progressed from word-of-mouth to newspaper want-ads to modern online services. The likes of Hotjobs.com and CareerBuilder.com have web sites containing millions of job posts. Furthermore, profession-specific sites such as careers.findlaw.com, jtpos.com have many more job postings specific to a particular industry or profession such as law. Even more geographically restricted sites such as orlandosentinel.com, Miami.com and latimes.com have job postings restricted to a certain geographic area (Orlando or Miami, Fla. and Los Angeles, Calif.). Add to that a plethora of corporate web sites such as att.com/hr (AT&T), dell.jobs.com (Dell) and 3m.com/careers (3M).

Each web site has its own collection of job postings, its own way of enabling the job seeker find the job they are looking for, its own format for displaying results and its own method/format for importing a résumé from the job seeker. Furthermore, many of these web sites require the job seeker have an account along with a username and password. In general, tens-of-thousands of new jobs are added, expired or modified every week; requiring the job seeker to periodically log onto all potential career site (remembering their logon credentials) and searching for their desired job using the tools specific to that web site.

Adding to the difficulty in finding a job is the variability of job application processes at each of the different career sites. Each site has its own set of pages the job seeker must maneuver to find, then to apply for a job. Each career site requires the job seeker to register and have a username and password for authentication. Each career site has a different set of data required for applying. Some career sites let the job seeker upload a résumé from a file and some require the job seeker to re-enter much of the information already contained in the job seekers résumé. All of which frustrates the job seeker.

Frustration and lost opportunities are caused by the job seeker having to remember user names and passwords from several different career sites; following the flow of different résumé capturing processes; and having to reenter details from their past experiences into data entry screens of the various career sites. Often, errors occur. The job seeker enters the date they started a job ten years ago as six years ago and the employer never calls—thinking there was a four-year gap in employment. Similarly, the job seeker enters 3 years of experience instead of 30 and an automatic screening program at the job website never delivers their résumé to a human relations person.

Often, a job seeker is without work and anxious to be reemployed. They apply for many positions per day or per week, hoping to find a good job. Because of the huge number of job postings hosted on the World Wide Web, it takes many hours to visit each career site, search for relevant jobs, sift through the "hits," then, add to that, added time to fill out a job application, repeating the same information that is often on the job seeker's résumé. Case in point, a patent attorney looking for a job may look at web sites specific to law such as IPLAW and AIPLA. This is not sufficient; the patent attorney may desire a corporate position and needs to visit many different corporate web sites such as AT&T, Lucent, HP, etc. This is still not enough. The patent attorney needs to visit many different general career websites such as Hotjobs.com and CareerBuilder.com. Often, the different career sites have different username and password restrictions or their favorite user name has already been taken. Therefore, they have several different login credentials, needing to keep track of such for each website. Furthermore, much time is wasted logging into and out of the myriad of career websites. To find a job quickly, the patent attorney visits all of the career sites every day to see if any new job postings were made the day prior, having to log in. Then, finding a new job posting, the patent attorney must fill out the requisite application and track their application so they don't apply for the same position twice and so they can schedule follow-up letters or phone calls. It is conceivable that, for some positions like patent attorney, engineer and management, a job seeker will have many active applications, perhaps over 200. Any improvement to the disparate collection of career sites will help the job seeker quickly find an open position, leading to a more efficiently employed population.

What is needed is a system that will capture a job seeker's résumé data, create shadow accounts on one or more career web sites and upload the résumé data to the one or more career web sites.

SUMMARY OF THE INVENTION

One objective of the present invention is to provide a computer automated way for a job seeker to deposit a copy of their résumé on one or more remote career websites.

Another objective of the present invention is to provide a system for creating and/or storing a job seeker's résumé or profile, the system providing tools for identifying target career websites onto which the job seeker's résumé will be installed.

In one embodiment, a method for distributing a résumé of a job seeker to career websites is disclosed including capturing a résumé or profile within a storage area of a computer and identifying at least one career website, then for each career website identified: navigating to the career website by the computer; logging onto the next website by the computer; and uploading the résumé to the career website from the storage area.

In another embodiment, a system for distributing a résumé of a job seeker to career websites is disclosed including a computer connected to a network with a storage device operationally adapted to the computer that has a job seeker profile and résumé stored within it. A user interface is provided to capture a list of target career websites and to capture at least one job seeker's résumé and resume blasting bots that execute on the computer are provide, the résumé blasting bots navigate to a career website within the list of target career websites through the network, log onto the career website and upload the one of the job seeker's résumé to the career website.

In another embodiment, a computer readable medium including computer programming instructions that cause a computer to perform the method for distributing a résumé or profile of a job seeker to career websites is disclosed, the method comprising the steps of capturing a résumé and identifying at least one career website and for each career website of the at least one career website: navigating to the career website, logging onto the next career website and uploading the résumé to the next career website.

In another embodiment, a computer program product for use with a computer system for distributing a résumé of a job seeker to career websites is disclosed including a computer usable medium having computer-readable code embodied in the medium, the computer-readable code having computer readable code for capturing a résumé or profile and computer readable code for identifying at least one career website. Furthermore, for each career website of the at least one career website there is computer readable code for navigating to the next career website and for logging onto the next career website and for uploading the résumé to the next career website.

BRIEF DESCRIPTION OF THE DRAWINGS

The invention can be best understood by those having ordinary skill in the art by reference to the following detailed description when considered in conjunction with the accompanying drawings in which:

FIG. 7 illustrates an example of a job posting of all embodiments of the present invention.

FIG. 8 illustrates a typical résumé of all embodiments of the present invention.

FIG. 9 illustrates a sample user interface screen showing résumé information extracted from a typical job seeker résumé of all embodiments of the present invention.

FIG. 12 illustrates a sample user interface screen for the job seeker to select one or more career sites to blast a stored résumé of all embodiments of the present invention.

FIG. 13 illustrates a sample user interface screen for showing the job seeker the status of the résumé blasting of all embodiments of the present invention.

DETAILED DESCRIPTION OF THE INVENTION

Figure 1:
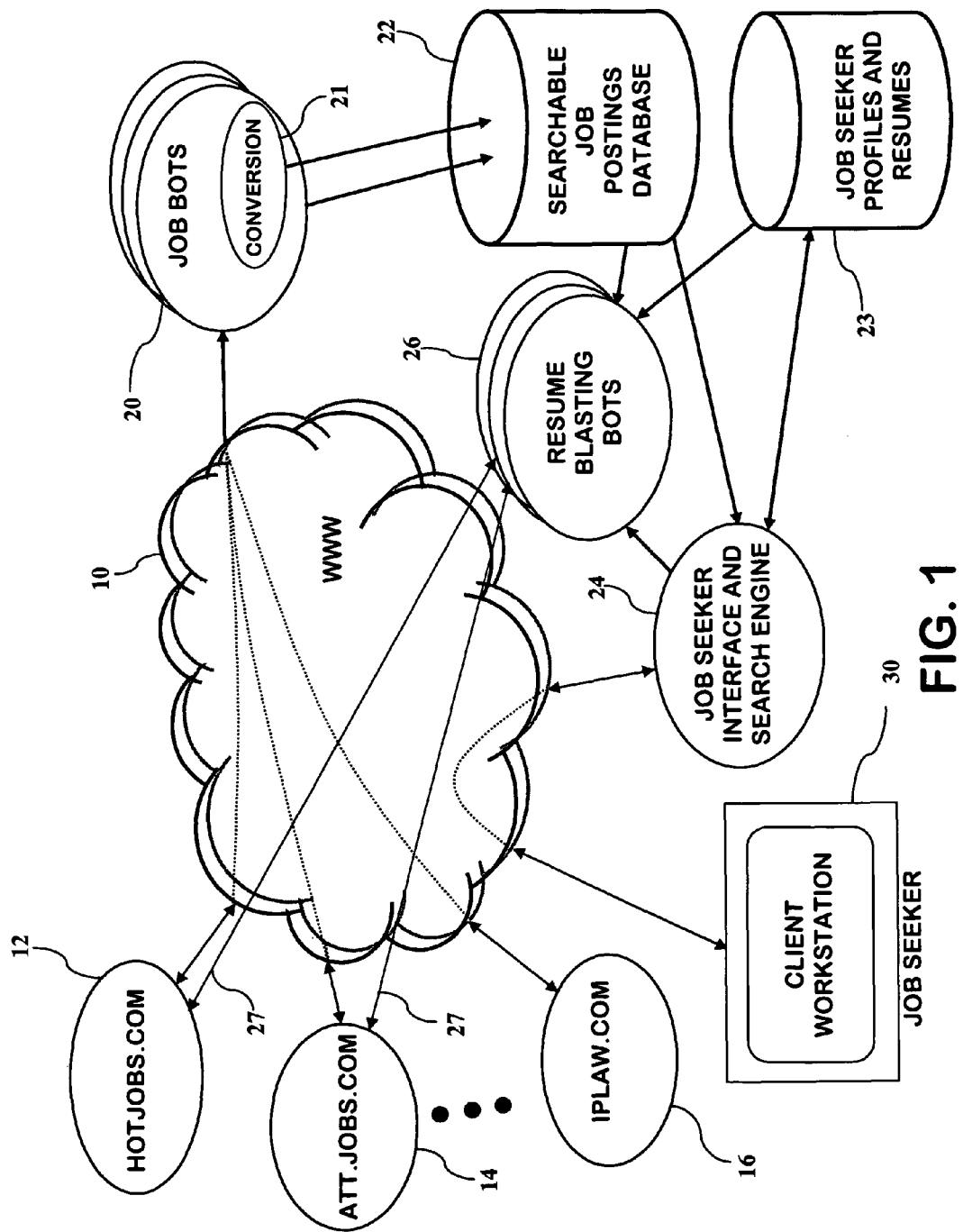
FIG. 1 illustrates an example system for consolidating job postings and blasting résumé information to career sites according to one embodiment of the present invention.

Reference will now be made in detail to the presently preferred embodiments of the invention, examples of which are illustrated in the accompanying drawings. Throughout the following detailed description, the same reference numerals refer to the same elements in all figures. Throughout the description, the term job post or job posting refers to any type of electronic advertisement for an open position, e.g., a job. The term career site or job post hosting site refers to any electronic site accessible by the system of the present invention and having at least one job post stored therein. The term searchable job posting database refers to a searchable database for storing job post information or data extracted from one or more job hosting sites. The searchable job posting database has a schema defining the structure and relationship of its contents, but the exact schema can vary without veering from the inventive parts of the present invention. Furthermore, the searchable job posting database can be managed by any database manager including, for example, Oracle and Microsoft® Access, without veering from the inventive parts of the present invention. The term job spider refers to a program that automatically extracts data related to job postings from the job postings on career websites. The terms O*NET® or O*NET® code or ONET code refer to a numeric encoding of an occupational title. O*NET® stands for the Occupational Information Network as supported by the United States Department of Labor. The term résumé blasting bot refers to a software module that, preferably, operates unattended and, provided with résumé data and a career website address, navigates the career website, logs onto the career website and creates a copy of the résumé on the career website, reporting any errors encountered. It does this by filling in fields and replying to prompts on the career website as a job seeker may do. Throughout this description, the term "résumé" refers to a collection of job seeker employment related information maintained in a database. The data includes information normally found on a job seeker's résumé such as education and employment history. Additionally, the data includes auxiliary information that is not commonly found on a résumé such as salary requirements, username, password and a resume-ID to uniquely identify a particular résumé. In this, the term "résumé" and "profile" are used interchangeably and include any and all possible data related to the job seeker.

Referring now to FIG. 1, an exemplary system for consolidating job postings and blasting résumé information to career sites is shown. The present invention includes job bots 20 that periodically visit job post hosting sites 12/14/16 to extract job post information. The job hosting sites 12/14/16 are, for example, for-fee career sites such as hotjobs.com 12; private corporate career sites such as AT&T Corporations att.jobs.com 14 and specialized for-fee career sites having a narrow set of types of jobs such as iplaw.com 16, having jobs related to the field of law. Other types of sites include the US and foreign governments and college web sites. The present invention is not limited to the type of hosting site. A staff person searching the network for job postings creates a list of the target sites.

For each particular hosting site 12/14/16, there is a corresponding job bot 20 designed to open job postings, parse information from the job postings and store the parsed information in the searchable job postings database 22. For much of the information found on the job postings, the data is copied directly into a record of the searchable job posting database 22. For example, the schema of the searchable job postings database 22 has a field for contact last name and the hosting site also has a field for contact last name, then that field is copied directly into the searchable record for that job posting. Alternately, if the job posting has a field for contact name (last, first) and the searchable job postings database 22 has a field for contact last name, then the field is passed through a conversion 21 that, in this example, copies all characters from the job post field for contact name up until the comma into the searchable job postings database 22 field for contact last name. The Searchable Job Post Fields in Table-1 below is an exemplary list of fields that are mined from the job posting into the searchable job postings database 22:

TABLE 1

Searchable Job Post Fields

| FIELD NAME | DESCRIPTION |
| --- | --- |
| Jobid | The job ID that is posted on the website. |
| JobWebsiteID | This is the job ID that the website. |
| jobtitle | The title of the job. |
| jobtype | Type of job. For example: full-time, part-time, and per-diem. |
| openings | Number of jobs of this type that are available. |
| postdate | The date the job was posted on the host site. |
| closedate | Last date to apply for the job. |
| startdate | When the job will be starting. |
| jobdesc | Description of the job. |
| education | Educational requirements of the job. |
| experience | The experience requirements of the job. |
| additionalinfo | Anything else that is relevant to the job that does not appear in another field. |
| shiftdesc | Information about the type of shift. |
| hours | Number of work hours per week. |
| benefits | Description of what benefits are included with the job and are specific for that job. |
| benefitsURL | A link to the benefits page, if one exists. |
| url | A link to the job details page. |
| applybyurl | A link to a page where the job seeker can go to apply for the job. |
| salarystring | What the job pays, or a pay scale. |
| salary | The numerical amount of the pay. |
| maxsalary | The maximum salary that is available |
| salaryunit | Code used to describe pay frequency. |
| employer | The employer's name. |
| contact | The contact person or department. |
| phone | Phone number |
| fax | Fax number |
| email | Email address |
| address1 | The street address where the job is located. |
| city | The city where the job is located. |
| state | The state where the job is located. |
| country | The country where the job is located. |

Once searchable job posting records are available in the searchable job postings database 22, a job seeker at a client workstation 30 connects to the job seeker interface and search engine 24 of the present invention through a network, for example the World Wide Web 10. At the job seeker interface and search engine 24, the job seeker can search for job postings from many different career sites 12/14/16 by searching the searchable job postings database 22. Once a job of interest is found (e.g., a record of the searchable job posting database 22 is identified), the job seeker can link back to the job hosting site 12/14/16 and apply for the job in the same manner as if they found the job on that particular job hosting site 12/14/16. The present invention also includes tools allowing the job seeker to register profile data (e.g., one or more résumés). Their résumé or profile data is stored in the job seeker profiles and résumés database 23 in individual fields for use later when the job seeker applies for a job or wants to blast their résumé to multiple career sites. An exemplary list of individual fields of the job seeker profiles and résumés database 23 is shown in Table 2.

TABLE 2

Job Seeker Profile Fields

| FIELD NAME | DESCRIPTION |
| --- | --- |
| Education | Schools attended |
| resumeID | Unique identity of each resume which is assigned by our server |
| Name | First name of person posting resume |
| Address | Street address of person posting resume |
| resumetitle | Title of resume to be posted |
| textFile | A compilation of the resume details in resume format |
| workStatus | If the person posting the resume is working or not |
| recentJobTitle | most recent job title |
| targetJobTitle | Job title that poster is looking for |
| AuthWorkInUS | If the person is authorized to work in US |
| emp_contact | Previous employer contact person |
| emp_startDate | Date started with previous employer |
| emp_jobtitle | Previous job title |
| emp_salary | Salary amount at previous employer |
| referenceName | Name of reference |
| Phone | Phone number of reference |
| referencetype | Type of reference given, IE: personal, professional, etc. |
| yearsknow | Years resume poster has known reference |
| SchoolStatus | If resume poster is in school at current |
| gpa_1 | School grade point average |
| major_1 | School major |
| compdate | Date of completion |

As will be shown, once the résumé information (or profile) is captured, the job seeker can elect one or more career sites as targets for their résumé to be blasted. In this, the job seeker interface and search engine 24 initiates one or more résumé blasting bots 26. When scheduled to run, each résumé blasting bot 26 retrieves the job seeker's résumé information fields from the job seeker profiles and résumés 23, logs onto the career websites 27 and acts as a surrogate job seeker on the selected career sites 12/14/16, creating an account for the job seeker and uploading the job seeker's résumé to the career site.

Figure 2:
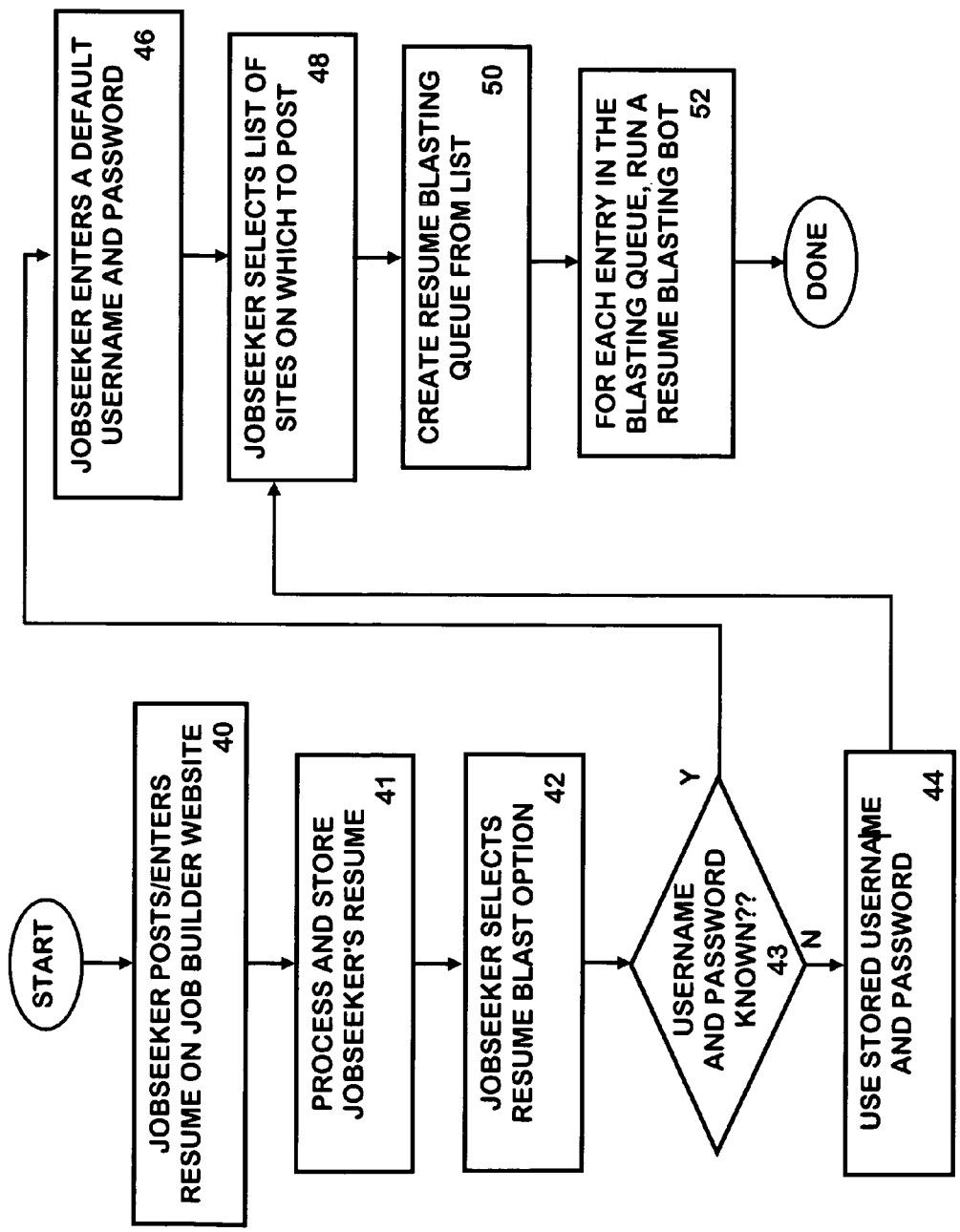
FIG. 2 illustrates a flow chart of the overall process for résumé blasting to job hosting web sites according to one embodiment of the present invention.

Referring now FIG. 2, a flow chart of the overall process for résumé blasting to job hosting web sites according to one embodiment of the present invention is shown. The process starts with the user or job seeker posting one or more résumés 40 on the present system. In the preferred embodiment, the résumé or résumés are created online with the job seeker interface and search engine 24 and stored 41 in the job seeker profiles and résumés database 21. In other embodiments the résumé or résumés (profiles) are uploaded as text files, they are processed (see FIG. 4) and stored 41 in the job seeker profiles and résumés database 23. Next, the job seeker selects the résumé blast option 42. At this point, if a default username and password is not already recorded 43, the jobseeker enters a desired username and password 46 and a résumé blasting apply bot 28 is initiated 54 to perform the résumé blasting function. Otherwise, the present invention creates a username and password set 46. Next, the job seeker selects which career sites 48 to which they want their résumé or profile to be blasted. Once completed, a queue of career sites is created from the list 50 and, at some time in the future, the queue is examined and a résumé blasting bot 28 is run for each entry in the queue 52. There are many ways to determine what order and when to run entries from the queue.

For example, a next entry is run when processor utilization is low or when network utilization is low. Another example is to examine the next entry and determine how many currently running résumé blasting bots 28 are accessing the target career site of that entry and wait until that number is below a certain threshold. There are many methods of achieving similar results and the exact method can be varied without veering from the intent of the present invention.

Figure 3:
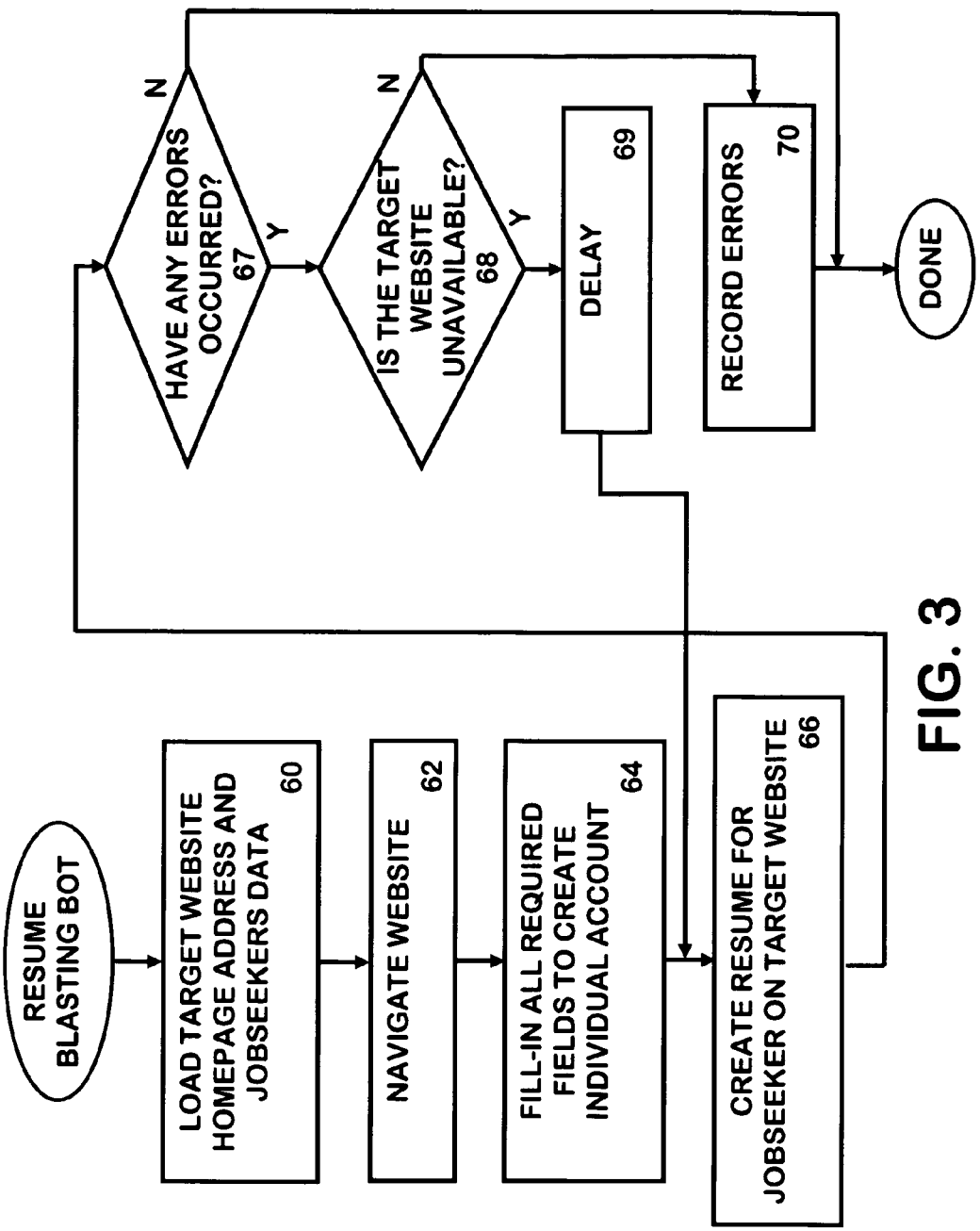
FIG. 3 illustrates a flow chart of the résumé blasting bot process for résumé blasting to job hosting web sites according to one embodiment of the present invention.

Referring now FIG. 3 illustrates a flow chart of the résumé blasting bot process for résumé blasting to job hosting web sites according to one embodiment of the present invention is shown. The résumé blasting bot 28 loads the target website's (career site) home page 60 and resume/profile data from the job seekers profiles and résumé database 23; and then visits the career site 62, filling in all required fields to create an individual account 64. The fields are populated with data extracted from the job seeker's résumé and/or from data entered by the job seeker such as the username and password described above. As an example of this, if the job seeker's résumé has name of "Ray Seeker" and the career web site has a field titled, "Name:", then the résumé blasting bot 28 populates the "Name:" field with "Ray Seeker". Once the account is successfully created, the résumé blasting bot 28 creates a copy of the job seeker's résumé to the career site 66. If any errors have occurred 67, the error is checked to see if the error is due to an inability to access the career website 68. If the error is not due to an inability to access the career website, the error is recorded 70 to signal the job seeker. These errors include, for example, the career site requiring a field to be completed while the résumé blasting bot 28 is not able to complete that field. For example, if the career site has a required field for "Date of Birth:" and that information is not available from the job seeker's résumé, the field is not populated and, if it is a required field, the account cannot be created and an error has occurred. If the error is due to an inability to access the career website 68, for example internet access is unavailable or the career website is off-line, a delay is taken 69, for example 3 hours, then another attempt to create the résumé for the job seeker is performed 66.

Figure 4:
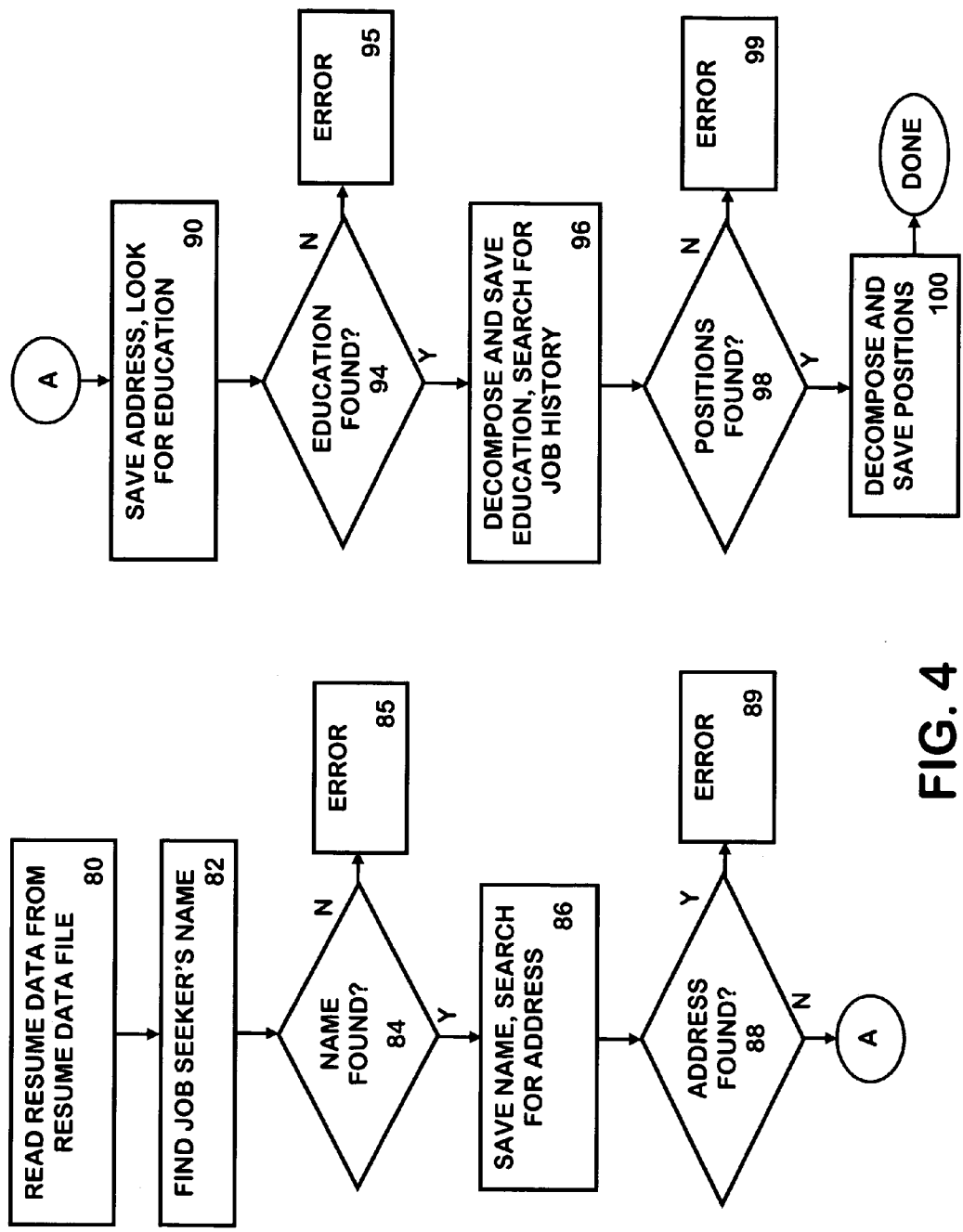
FIG. 4 illustrates a flow chart for extracting information from a job seeker's résumé according to one embodiment of the present invention.

Referring now FIG. 4 illustrates a flow chart for extracting information from a job seeker's résumé according to one embodiment of the present invention is shown. In the preferred embodiment, the job seeker enters employment information and profile information directly into a user interface 24 and such data is stored in the job seeker profile and résumé database 23. In other embodiments, the job seeker uploads a text résumé and the text résumé is decomposed into discrete pieces of information or fields and stored in the job seekers profiles and résumé database 23. This is a simplified example of extracting several discrete pieces of information from the job seeker's résumé(name, address, education and positions). Many other fields can be extracted without veering from or limiting the present application. For example, managerial experience, criminal background, security clearances, awards/recognition and date of birth are examples of other information that can be extracted. During the extraction, certain data is normalized or converted to a common format and representation so that it is easier to process later. Using age as an example, date of birth is the preferred format for storing this information. If the résumé contains the job seeker's age, assuming the job seeker was that age during the current year, the date of birth is deducted from the age and stored in a standard format (e.g., 01/01/1960. Later, if filing out a career website page, the date of birth is required in a different format such as mm/dd/yy, the standard format is easily converted to the required format (e.g., 01/01/1960). Similar conversions and analysis of the job seeker's résumé are performed to determine other key data from textual representations such as years of experience from a list of prior positions.

The process of extracting certain résumé data from a résumé starts with reading the résumé data from a data file that is either uploaded by the job seeker or created online 80. The first step is to find the job seeker's name 82. This can be done by various heuristic methods such as indexing words from the résumé in a first name dictionary to find a name [e.g., index("Patent") is false, index("Ray") is true.] Another method includes looking in well known places within the text or searching for prefix keywords ("résumé of" or "Name:"). If the name is not found 84, an error is reported 85. If the name is found, it is stored and a search is performed for the job seeker's address 86. This too can be done by various heuristic methods such as indexing words from the résumé in a city name dictionary to find a name [e.g., index("Patent") is false, index("Toledo") is true.] Another method includes looking in well known places within the text, searching for prefix keywords ("Street" or "Blvd.") or looking for a specific string of formatted text ("###<word> Street, <word> <state> #####"). If the address is not found 88, and error is reported 89. If the address is found 88, it is saved and the résumé is searched for educational background 90. This too can be done by various heuristic methods such as indexing words from the résumé in a degree name dictionary to find a degree name [e.g., index ("Patent") is false, index("MS") is true, index("Masters") is true.] Another method includes looking in well known places within the text, searching for prefix keywords ("Education" or "Schools"), etc. If the education is not found 94, an error is reported 95. If the education is found, it is further decomposed into individual educational fields (e.g., one per degree) and a search for job history is performed 96. This too can be done by various heuristic methods such as indexing words from the résumé in a company name dictionary to find a company name [e.g., index("Patent") is false, index ("AT&T") is true.] Another method includes looking in well known places within the text, searching for specific keywords (e.g., "managed," "supervised") or looking for specific lead patterns (e.g., "1998 to 2002" or "2002—present"). If the job history is not found 98, an error is reported 99. If job history is found 98, it is (optionally) further decomposed (e.g., to extract the total years of experience, etc.) and stored 100.

Figure 5:
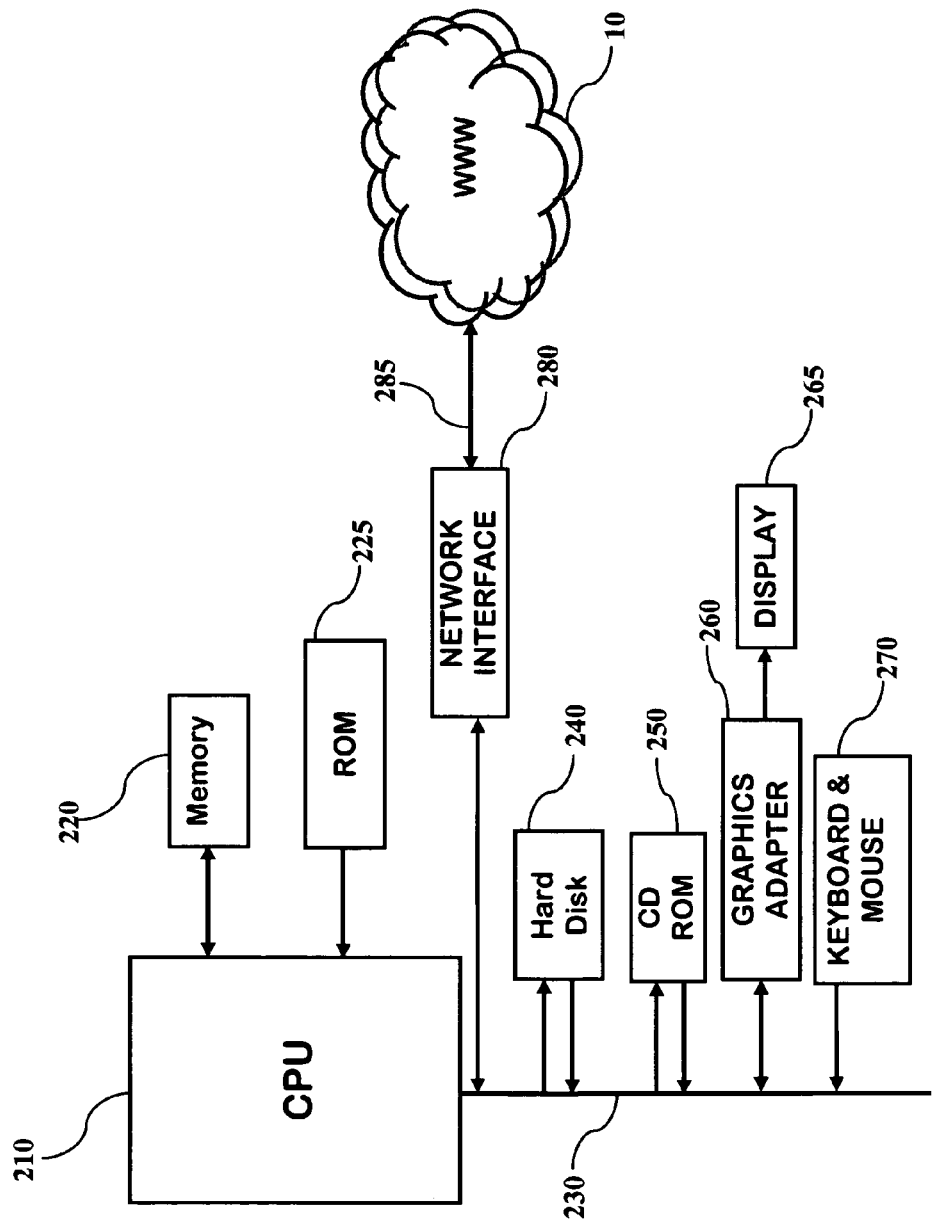
FIG. 5 illustrates an example computer system of all embodiments of the present invention.
Figure 6:
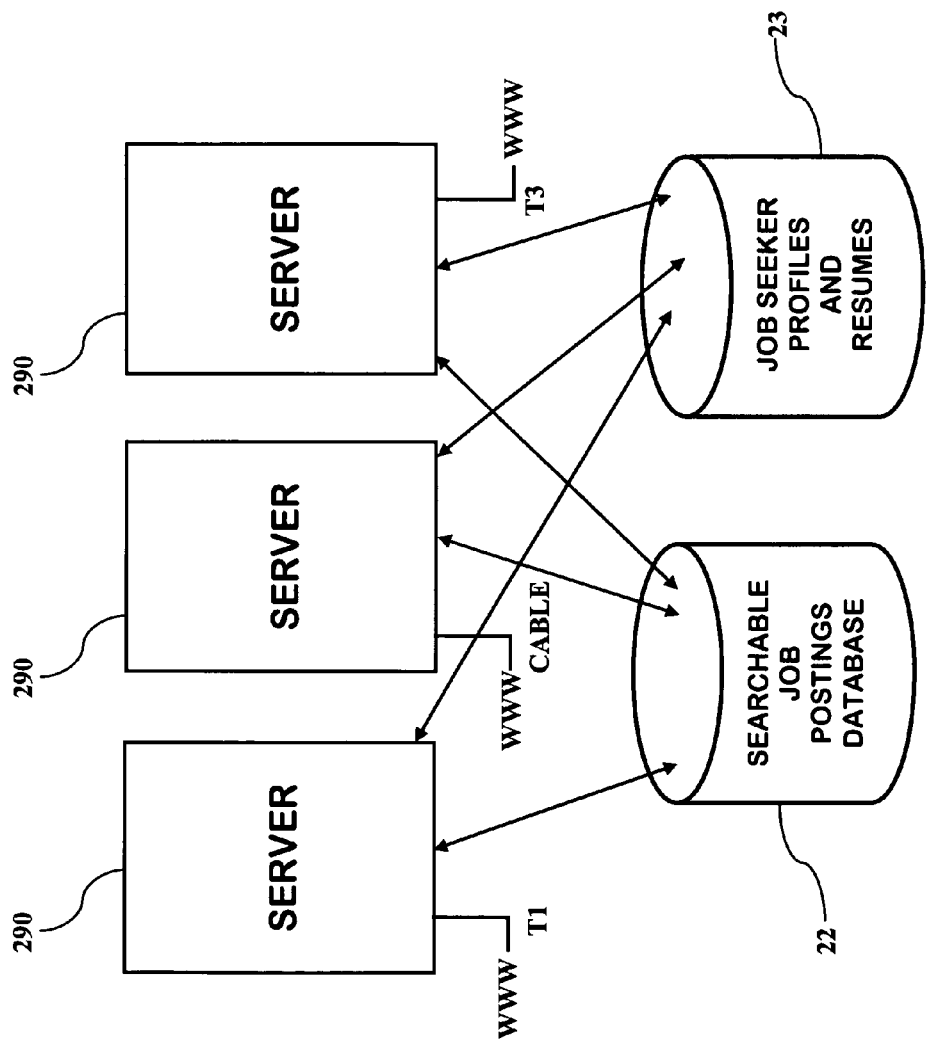
FIG. 6 illustrates a second example computer system of all embodiments of the present invention.

Referring to FIG. 5 and FIG. 6, a schematic block diagram of an exemplary computer system of the present invention is shown. Although shown in its simplest form, having a single processor, many different computer architectures are known that accomplish similar results in a similar fashion and the present invention is not limited in any way to any particular computer system. The present invention works well utilizing a single processor system as shown in FIG. 5, a multiple processor system where multiple processors share resources such as memory and storage, a multiple server system (as in FIG. 6) where several independent servers operate in parallel (perhaps having shared access to the searchable job posting database 22) or any combination. In this, a processor 210 is provided to execute stored programs that are generally stored for execution within a memory 220. The processor 210 can be any processor or a group of processors, for example an Intel Pentium-4® CPU or the like. The memory 220 is connected to the processor and can be any memory suitable for connection with the selected processor 210, such as SRAM, DRAM, SDRAM, RDRAM, DDR, DDR-2, etc. Firmware is stored in firmware storage 225 that is connected to the processor 210 and may include initialization software known as BIOS. This initialization software usually operates when power is applied to the system or when the system is reset. In some embodiments, the software is read and executed directly from the firmware storage 225. Alternately, the initialization software is copied into the memory 220 and executed from the memory 220 to improve performance.

Also connected to the processor 210 is a system bus 230 for connecting to peripheral subsystems such as a network interface 280, a hard disk 240, a CDROM 250, a graphics adapter 260 and a keyboard/mouse 270. The graphics adapter 260 receives commands and display information from the system bus 230 and generates a display image that is displayed on the display 265.

In general, the hard disk 240 may be used to store programs, executable code and data persistently, while the CDROM 250 may be used to load said programs, executable code and data from removable media onto the hard disk 240. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, laser disk, etc. In some embodiments, other devices are connected to the system through the system bus 230 or with other input-output connections. Examples of these devices include printers; mice; graphics tablets; joysticks; and communications adapters such as modems and Ethernet adapters.

The network interface 280 connects the computer-based system to the world-wide-web 10 through a link 285 which is, preferably, a high speed link such as a cable broadband connection, a Digital Subscriber Loop (DSL) broadband connection, a T1 line or a T3 line.

FIG. 6 shows a set of servers 290, each having access to the searchable job posting database 22 and the job seeker profiles and résumés database 23. In this example, résuméblasting bots 26 can be run in parallel on each server 290, accessing the job post hosting sites through, in this example, a serial T1 line operating at 1.44 Mbps providing access to the world-wide-web (www). Although T1, T3 and Cable connections are shown, any broadband connection works equally as well including dial-up, fiber, cable, DSL, T1 and T3. The searchable job postings and job seeker profiles/resume databases are stored in storage devices accessible by each of the processors of the present system. Many storage devices as well as mechanisms of interfacing the storage devices to the processors of the present invention are known in the industry. For example, storage devices include stand alone disk drives, disk arrays, raid arrays, etc. Examples of interfaces include direct attachment (e.g., ATA, Serial ATA, ATAPI), Network Attached Storage (NAS), remote storage and the like.

Referring to FIG. 7, an example of a typical job posting 170 of all embodiments of the present invention is shown. In this example, key information in the job posts are found relating to the Searchable Job Post Fields in Table-1:

1. jobtitle follows "Job Title:"
2. jobdesc follows "RESPONSIBILITIES:" and ends just before "EDUCATIONAL REQUIREMENTS".
3. company follows "Company:" and ends just before "Click here"

In the example job posting 170, there is a location of the job (Tampa, Fla.) 172, the job title (tax preparer) 173, a job requisition number (00073-044444) 174 and company ("H&R Block") 175. Following that is a description of the job responsibilities, educational requirements and candidate profile. When this job posting is processed by the job bot 20, the link associated with "click here to apply" 177 is saved in the job post database in a field called applybyurl as in Table 1. By keeping this link, a job seeker finding this job posting by searching the job post database 22 using the job seeker interface and search engine 24 can apply directly to the position.

Referring now FIG. 8, a typical résumé 180 of all embodiments of the present invention is shown. In this typical résumé, created and formatted by a job seeker, the first line includes the name of the job seeker 182. Next, the job seeker has their field or specialty ("Patent Attorney") 184. Other examples of this are "Engineer," "Electrician," "Truck Driver," and "Clerk." In this example, the job seeker lists their experiences in reverse chronological order after a lead-in word "Experience:" 186. There are two previous jobs listed, one from August 1998—January 2002 and the other from February 2002—Present. Next, the job seeker lists their educational background after "EDUCATION:" 188. In this example, the job seeker has a JD and a BS degree. Personal information follows the lead-in "PERSONAL:" 190.

Referring now FIG. 9, a sample user interface screen showing résumé information fields from a typical job seeker résumé of all embodiments of the present invention is shown. This exemplary set of information was preferably entered by the job seeker or was extracted from the résumé of FIG. 8. The top section 300 shows status information regarding this résumé including a name given to the résumé, the date it was last modified, privacy options and a list of visible information.

This is just an example of auxiliary information that is tracked for each résumé. Next, personal information from the résumé or profile is presented. In the personal information header 302, an "[Edit]" button is provided for the job seeker to click and change the information in the personal information section 304. In this example, the personal information 304 includes the job seeker name, phone, home location and email, though in other embodiments, more or less information is maintained.

Next, experience information is presented. In the experience information header 306, an "[Edit]" button is provided for the job seeker to click and change the information in the experience section 308. In this example, the experience information 308 includes total years of experience, managed others (Y/N), job categories, security clearance (Y/N), most recent wages, languages spoken and felony conviction (Y/N); though in other embodiments, more or less information is maintained. Next, educational information is presented. In the educational information header 310, an "[Edit]" button is provided for the job seeker to click and change the information in the educational information section 312. In this example, the educational information 312 includes schools attended, major and degree; though in other embodiments, more or less information is maintained. Next, desired position information is presented. In the desired position information header 314, an "[Edit]" button is provided for the job seeker to click and change the information in the desired position section 316. In this example, the desired position information 316 includes desired wages, desired employment type (e.g., "part time"), desired commute (e.g., 15 minutes) and relocation willingness (e.g., "Florida" or "Southeast"); though in other embodiments, more or less information is maintained. The information tracked is either extracted from the job seeker's résumé or entered through a user interface similar to that in FIG. 9.

Figure 10:
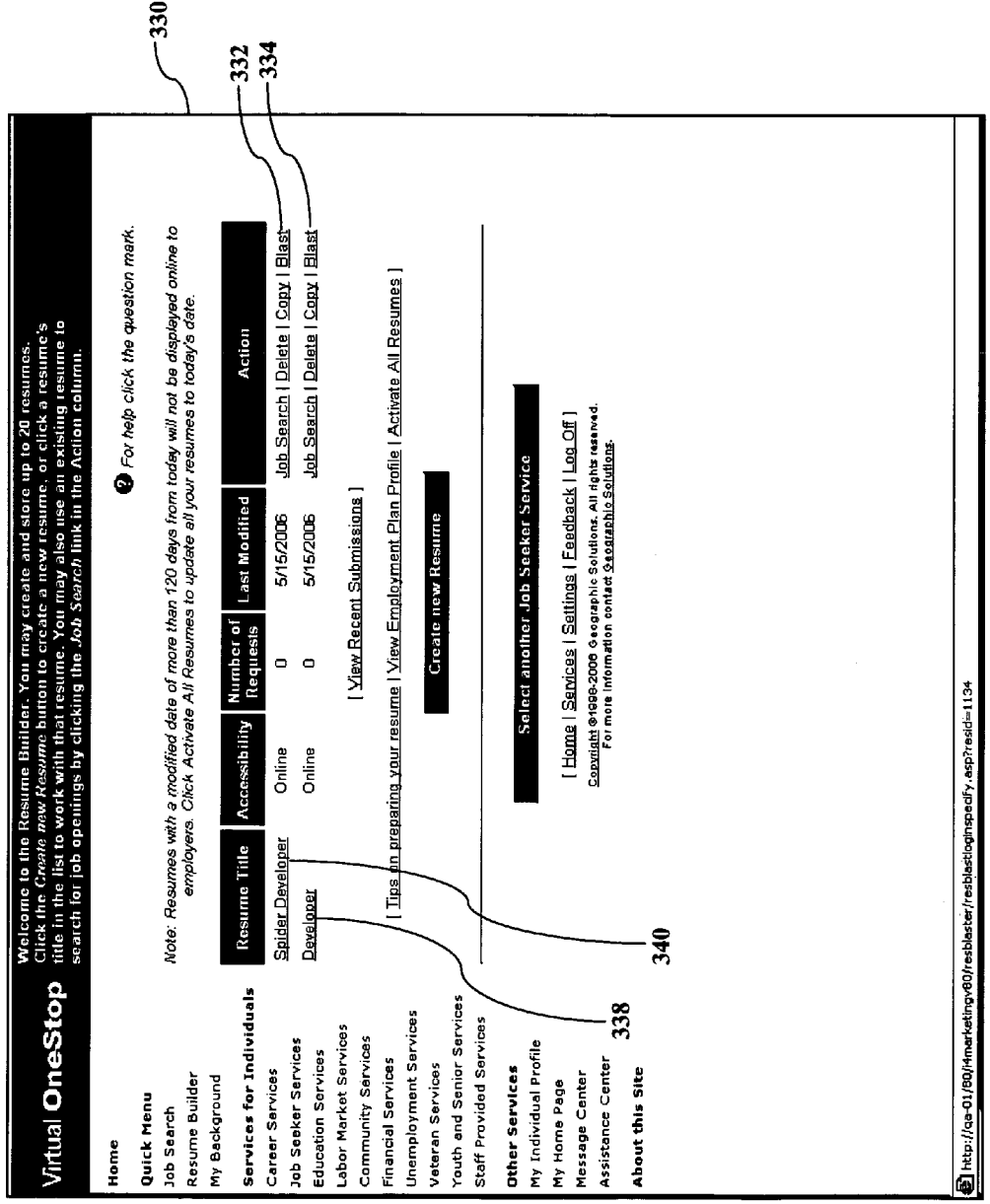
FIG. 10 illustrates a sample user interface screen providing a résumé selection for a typical job seeker to select a stored résumé of all embodiments of the present invention.

Referring now FIG. 10, a sample user interface screen providing a résumé selection for a typical job seeker to select a stored resume/profile of all embodiments of the present invention is shown. This user interface screen 330 provides an interface for the job seeker to manage multiple resumes/profiles, for example two resumes/profiles as shown ("spider developer" 340 and "developer" 338). Through this interface, the job seeker has the ability to use the résumé to incorporate in a job search, to delete the résumé, to copy the résumé and to blast the résumé 332/334. In this example, if the job seeker clicks on the name of the resume/profile, they are presented with an interface as in FIG. 9, where they can edit the résumé. If the job seeker wants to blast the spider developer résumé 340 to one or more career sites, the job seeker selects the "blast" button 332 that correlates to the spider developer résumé. If the job seeker wants to blast the developer résumé

338 to one or more career sites, the job seeker selects the "blast" button 334 that correlates to the spider developer résumé.

Figure 11:
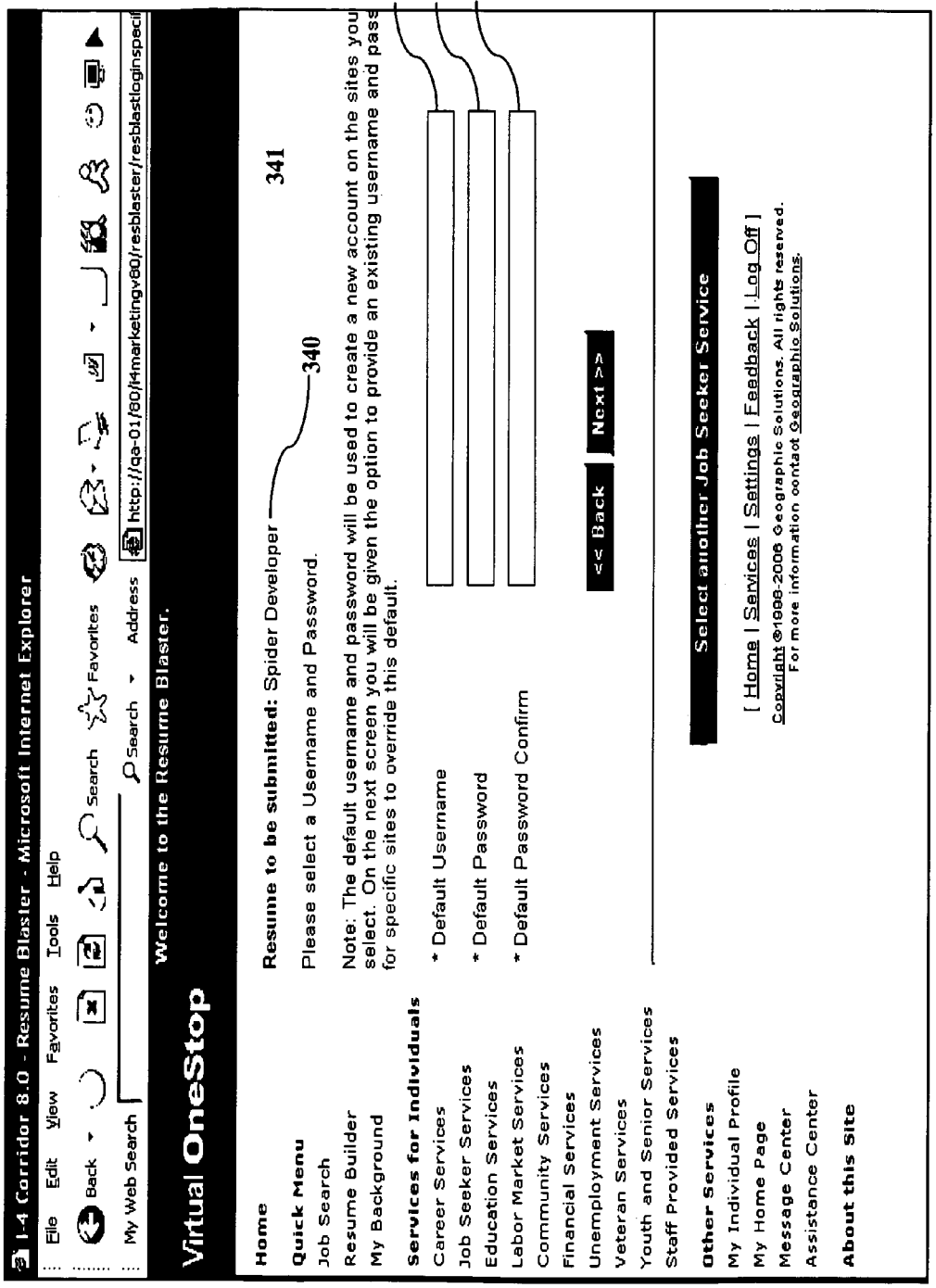
FIG. 11 illustrates a sample user interface screen for the job seeker to provide a username and password for blasting a stored résumé of all embodiments of the present invention.

Referring now FIG. 11, a sample user interface screen 341 for the job seeker to provide a username and password for blasting a stored résumé of all embodiments of the present invention is shown. In this example, the job seeker has selected to blast the spider developer résumé 340 (see FIG. 9) and a user name 344 and password 346 and a confirmation password 348 are requested. Once the job seeker enters this information and selects "NEXT," the résumé blasting selection interface of FIG. 12 is presented.

Referring to FIG. 12, a sample user interface screen 350 for the job seeker to select one or more career sites to blast a stored résumé of all embodiments of the present invention is shown. The job seeker has selected to blast their "Spider Developer" résumé 340 to one or more career websites in the prior user interface screens. This interface lists the possible career sites 352 to which the job seeker's résumé can be blasted. The job seeker checks the selection box in the career site section 352 for each career site of interest. Next, the job seeker selects a username and password type 354 which can be the default (the username and password entered in the interface of FIG. 10) or a pre-existing username/password (e.g., the job seeker already has a username/password for the associated career site). The username 358 and password 356 fields are pre-filled according to the username and password created in the interface of FIG. 11. If the job seeker selects "pre-existing," they need to type the username 358 and password 356 that the job seeker already has at that career site. When done, the job seeker's selected resume/profile is blasted to the selected career sites as described above. Note that this is not an immediate process since the blasting is, in some embodiments, queued and the career site may not be currently available, etc. The job seeker can view the status of the résumé blasting activity in an interface such as shown in FIG. 13.

Referring to FIG. 13, a sample user interface screen 360 for showing the job seeker the status of the résumé blasting of all embodiments of the present invention is shown. In this example, the job seeker has requested that his/her résumé referred to as "Spider Developer" 340 be blasted to several career sites with varying success. For example, this résumé has been successfully created on "Career Builder" as shown with entry 362. Additionally, this résumé could not be created on "AmericaJobBank" as shown with entry 364. There are many reasons for such a failure, including missing required information regarding the job seeker, inability to contact the career site (e.g., a time-out), etc. Lastly, the blasting of this résumé to BestJobUSA is still pending as shown with entry 366. This could be due to, for example, scheduling, unavailability of the career site or temporary unavailability of a network connection.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A computer operated method for distributing a resume of a job seeker to career websites, the method comprising the steps of:
  storing resume data from a job seeker within a storage area of a server computer;
  the server presenting a list of career websites in a user interface to the job seeker;
  selecting at least one career website from the list of career websites by the job seeker;
  for each next career website of the at least one career website:
    the server computer navigating to the next career website without user interaction;
    if a username and a password for the job seeker on the next career website is known, the server computer logs onto the next career website without user interaction using the username and password,
    if the username and the password for the job seeker on the next career website is unknown, the server computer creates a default user account on the next career website using a default username and a default password and the server computer logs onto the next career website without user interaction using the default username and the default password; and
    the server computer populating fields on the career website from the resume data from the storage area without user interaction.

2. The method according to claim 1, wherein the default username and default password are specified by the job seeker.

3. The method according to claim 1, wherein the resume data is stored in a job seeker profiles and resumes database.

4. The method according to claim 1, wherein the storing of the resume data includes entering the resume data by the job seeker at a user interface.

5. The method according to claim 1, wherein the step of storing the resume data further includes extracting information from an uploaded text resume.

6. The method according to claim 1, wherein the step of storing resume data from a job seeker within a storage area of a server computer further includes the step of uploading a formatted resume from a client computer.

7. A system for distributing a resume of a job seeker to career websites, the system comprising:
  a server computer connected to a network;
  a storage device operationally adapted to the server computer;
  a job seeker profile and resume database stored within the storage device;
  a user interface presented on a client computer, the client computer communicating with the server computer to capture a list of target career websites from the job seeker; and
  a plurality of resume blasting bots executing on the server computer, each of the plurality of resume blasting bots navigating to a career website within the list of target career websites without user interaction through the network, if a username and a password for the job seeker for the career website is known, the resume blasting bot logs onto the career website without user interaction using the username and the password; and if the username and the password for the job seeker on the career website is unknown, the resume blasting bot creates a default user account on the career website using a default username and a default password and the resume blasting bot logs onto the career website without user interaction using the default username and the default password and the resume blasting bot fills in fields on the career website using the job seeker profile and resume database without user interaction.

8. The system of claim 7, wherein the network is a world-wide-web.

9. The system of claim 7, wherein the server computer comprises multiple processors.

10. The system according to claim 7, wherein the resume blasting bot creates a default user account on the career website.

11. The system according to claim 10, wherein the default username and default password are specified by the job seeker.

12. The system according to claim 7, wherein the resume blasting bot uses a generated username and a generated password to create a default user account on the career website.

13. The system according to claim 7, wherein the resume blasting bots use the information from the resume fields to create the default username and the default password.

14. A computer system having computer instructions running on a server computer, the computer instructions cause the server to perform a method for distributing a resume of a job seeker to career websites, the method comprising the steps of:
- capturing job seeker resume data from a client computer to the server computer;
- storing the job seeker resume data in a storage, the storage interfaced to a server computer;
- extracting resume fields from the job seeker resume data;
- identifying at least one career website;
- for each next career website of the at least one career website:
  - the computer instructions causing the server computer navigating to the next career website without user interaction;
  - if a username and a password for the job seeker for the career website are known, the computer instructions causing the server to log onto the next career website without user interaction using the username and the password;
  - if the username and the password for the job seeker for the career website are unknown, the computer instructions causing the server to create a default user account on the next career website using a default username and a default password and the computer instructions causing the server to log onto the career website without user interaction using the default username and the default password; and
  - the computer instructions causing the server computer to populate fields on the next career website using the resume fields without user interaction.

15. The computer system having computer instructions running on a server computer, the computer instructions cause the server to perform the method for distributing a resume of a job seeker to career websites according to claim 14, wherein the step of logging onto the next career website uses a pre-existing username and a pre-existing password provided by the job seeker.

16. The computer system having computer instructions running on a server computer, the computer instructions cause the server to perform the method for distributing a resume of a job seeker to career websites according to claim 14, wherein the default username and default password are specified by the job seeker.

17. The computer system having computer instructions running on a server computer, the computer instructions cause the server to perform the method for distributing a resume of a job seeker to career websites according to claim 14, wherein the resume profile data is stored in a job seeker profiles and resumes database.

18. The computer system having computer instructions running on a server computer, the computer instructions cause the server to perform the method for distributing a resume of a job seeker to career websites according to claim 14, wherein the resume profile data is created by uploading a word processing version of a resume from a client workstation.

19. The computer system having computer instructions running on a server computer, the computer instructions cause the server to perform the method for distributing a resume of a job seeker to career websites according to claim 14, wherein the computer instructions causing the server computer to populate fields on the next career website using the job seeker resume data also uploads a formatted resume to the next career website.

20. A server computer system for distributing a resume of a job seeker to career websites comprising:
- a plurality of instructions running on the server computer that capture resume data from a client computer and extract resume fields from the resume data;
- a plurality of instructions running on the server computer that receive at least one career website from the client computer;
- for each next career website of the at least one career website:
  - a plurality of instructions running on the server computer that navigate to the next career website without user interaction;
  - a plurality of instructions running on the server computer that log onto the next career website without user interaction; if a username and a password for the job seeker for the career website are known, the instructions running on the server computer that log onto the next career website log onto the next career website without user interaction using the username and the password;
  - if the username and the password for the job seeker for the career website are unknown, the instructions running on the server computer that log onto the next career website create a default user account on the next career website using a default username and a default password and the instructions running on the server computer that log onto the next career website log onto the career website without user interaction using the default username and the default password; and
  - a plurality of instructions running on the server computer that populate fields on the next career website using the extracted resume fields without user interaction.

21. The server computer system for distributing a resume of a job seeker to career websites according to claim 20, wherein the instructions running on the server computer cause the server computer to log onto the next career website uses a pre-existing username and a pre-existing password provided by the job seeker without user interaction.

22. The server computer system for distributing a resume of a job seeker to career websites according to claim 20, wherein the default username and default password are specified by the job seeker.

23. The server computer system for distributing a resume of a job seeker to career websites according to claim 20, wherein the extracted resume fields are stored in a job seeker profiles and resumes database.

24. The server computer system for distributing a resume of a job seeker to career websites according to claim 20, wherein the plurality of instructions running on the server computer that capture the resume data from a client computer captures the resume data from a plain text resume from the client computer.

25. The server computer system for distributing a resume of a job seeker to career websites according to claim 20, wherein the plurality of instructions running on the server computer that populate fields on the next career website also uploads a formatted resume to the next career website.

\* \* \* \* \*